United States Patent [19]
Koch et al.

[11] Patent Number: 5,718,980
[45] Date of Patent: Feb. 17, 1998

[54] GLASS SUBSTRATES COVERED WITH A STACK OF THIN COATINGS, APPLICATION TO GLAZINGS HAVING PROPERTIES OF REFLECTING IN THE INFRARED AND/OR PROPERTIES IN THE FIELD OF SOLAR RADIATION

[75] Inventors: Stephanie Koch, Asnieres; Veronique Rondeau, Aubervilliers; Jean-Pierre Brochot; Olivier Guiselin, both of Paris, all of France

[73] Assignee: Saint-Gobain Vitrage International, Courbevoie, France

[21] Appl. No.: 742,691

[22] Filed: Nov. 4, 1996

Related U.S. Application Data

[63] Continuation of Ser. No. 194,226, Feb. 9, 1994, abandoned.

[30] Foreign Application Priority Data

Feb. 11, 1993 [FR] France ................................. 93 01546

[51] Int. Cl.[6] .................................................. B32B 15/00
[52] U.S. Cl. .................... 428/428; 428/432; 428/433; 428/434; 428/469; 428/472; 428/698; 428/701; 428/702
[58] Field of Search ........................... 428/432, 433, 428/434, 469, 472, 216, 428, 698, 699, 701, 702, 913; 359/360, 585, 589

[56] References Cited

U.S. PATENT DOCUMENTS

| | | | |
|---|---|---|---|
| 3,619,235 | 11/1971 | Furuuchi | 359/360 |
| 4,568,578 | 2/1986 | Arfsten | 428/432 |
| 4,960,310 | 10/1990 | Cushing | 359/360 |
| 4,965,121 | 10/1990 | Young | 359/360 |
| 5,055,358 | 10/1991 | Livingston | 428/432 |
| 5,061,568 | 10/1991 | Kessel | 428/432 |
| 5,069,968 | 12/1991 | Nietering | 428/432 |
| 5,168,003 | 12/1992 | Proscia | 428/432 |
| 5,201,926 | 4/1993 | Szczyrbowski et al. | 65/60.2 |
| 5,229,205 | 7/1993 | Nietering | 428/432 |
| 5,248,545 | 9/1993 | Proscia | 428/432 |
| 5,254,392 | 10/1993 | Burns | 428/432 |
| 5,337,191 | 8/1994 | Austin | 359/360 |

FOREIGN PATENT DOCUMENTS

| | | |
|---|---|---|
| A-2 669 325 | 5/1992 | France. |
| WO-A-90 02653 | 3/1990 | WIPO. |

OTHER PUBLICATIONS

Chem. Abstracts, JP-A-01 188446 (1989).
Research Disclosure No. 336 (1992).
Chemical Abstracts, vol. 112, No. 10, 5 Mars 1990, Columbus, Ohio, US; Abstract No. 82819s, p. 346; *abrege* & JP-A-01 188446 (Nippon Sheet Glass Ltd Co) 27 Jun. 1989.
Research Disclosure No. 336, Apr. 1992, Havant GB p. 262 XP304809 Disclosed Annonoymously 'Improving Stability of Heat Mirror Glazing Composites'.

Primary Examiner—Timothy Speer
Attorney, Agent, or Firm—Oblon, Spivak, McClelland, Maier & Neustadt, P.C.

[57] ABSTRACT

A transparent substrate provided with a covering multi-layer stack of thin coatings of which at least one is a metal coating (5) having low emissivity characteristics in the infrared positioned between two layers of the multi-layer stack, which are formed of a dielectric material, said multi-layer stack having at least one wetting layer below the metal coating (5), which wetting layer is based on tantalum oxide or niobium oxide.

21 Claims, 1 Drawing Sheet

GLASS SUBSTRATES COVERED WITH A STACK OF THIN COATINGS, APPLICATION TO GLAZINGS HAVING PROPERTIES OF REFLECTING IN THE INFRARED AND/OR PROPERTIES IN THE FIELD OF SOLAR RADIATION

This is a Continuation of application Ser. No. 08/194,226, filed on Feb. 9, 1994, now abandoned.

BACKGROUND OF THE INVENTION

1. Field of the Invention

The invention relates to transparent and in particular glass substrates coated with a plurality of thin coatings having at least one metal coating able to act on solar radiation and on infrared radiation of considerable wavelength.

The invention also relates to the use of such substrates for producing thermal insulation and/or solar protection glazings. The latter are intended for equipping both buildings and vehicles with the objective being to reduce air conditioning costs and/or the excessive overheating caused by the ever increasing size of glazed surfaces in vehicle passenger compartments.

2. Description of the Background

One known thin coating constituted of plural layers for imparting to a substrate, in particular low emissivity properties, has at least one metal coating such as a silver coating, placed between two dielectric material coatings, such as metal oxide coatings. This multi-layer stack is generally obtained by a succession of deposits performed by a vacuum procedure such as cathodic sputtering optionally assisted by a magnetic field. Although the silver coating essentially determines the thermal performance characteristics of the product, particularly with regards to the emissivity of the glazing obtained, the dielectric material coatings fulfill several functions, because they initially act in an interfering manner on the optical appearance of the substrate. They also make it possible to protect the silver coating from chemical and/or mechanical action.

Thus, European patent application EP-A-226 993 discloses a multi-layer stack having a silver coating placed between two coatings of a dielectric material constituted of mixed tin and zinc oxide. This stack also has very thin, so-called "anchoring" or "nucleating" coatings made from metal and in particular copper placed at the interface between the silver coating and each of the oxide coatings in order to increase mutual adhesion, which leads to an increase in the overall durability of the stack.

Still with a view to improving the resistance to corrosion of the silver coating, French patent FR-B-2 641 271 describes a stack in which the silver coating is placed between two dielectric material layers, each of the layers being constituted of a plurality of metal oxide coatings. The layer below the silver coating is constituted by three superimposed oxide coatings, including a tin oxide coating, with the layer adjacent the silver coating being a layer of zinc oxide. The patent discloses that these oxide layers serve to protect the silver, particularly by making it less vulnerable to the action of oxygen. However, the zinc oxide coating thickness is limited, because the zinc oxide, which has otherwise poor resisting characteristics, if present in an excessive quantity, would weaken the complete stack. French patent FR-B-2 641 272, which corresponds to U.S. Pat. No. 5,153,054, and whose teaching is very close to that of the above-discussed French patent, also defines that the presence of a zinc oxide coating on the sacrificial metal coating covering the silver coating also contributes to protecting it against oxidation. A need continues to exist for a transparent substrate having a multi-layer stack of coatings which exhibits improved thermal characteristics.

SUMMARY OF THE INVENTION

Accordingly, one object of the present invention is to provide a transparent substrate having a multi-layer stack thereon of functional coating or coatings, which structure not only exhibits satisfactory durability, but which also has improved thermal properties, particularly lower emissivity values, without loss of optical properties.

Another object of the invention, is to provide a transparent substrate with a multi-layer stack, which structure has improved optical properties, particularly higher light transmission values, while maintaining good thermal properties.

In the present invention a transparent, and in particular, glass substrate is provided with a multi-layer stack of thin coatings constituted of at least one metal coating having solar radiation properties and/or infrared which include low emissivity, which is located between two layers, each of which is a dielectric material. In the present invention, the multi-layer stack is designed in such a way that the layer below the metal coating has at least one "wetting" layer either consisting of a coating based on tantalum oxide or a coating based on niobium oxide, optionally surmounted by a thin metal alloy or metal-based coating, such as nickel-chromium or tin. The metal coating has low emissivity solar radiation and/or infrared radiation characteristics and is based on silver. It is referred to hereinafter as the "functional coating".

When the performance characteristics, i.e., the optical and thermal properties, of a transparent substrate having multi-layer stack as defined herein above are compared with the properties of the same stacked structure having the same thickness, but lacking a "wetting" coating based on tantalum oxide or niobium oxide, the stack according to the present invention has a lower emissivity and even a higher light transmission than the stacked structure which does not contain a "wetting" coating. Thus, it has been discovered that the choice of the nature of the dielectric material layers and in particular the layer below the functional coating has an influence not only on the chemical and/or physical durability of the stack protecting the functional coating, but also on its intrinsic properties such as its emissivity value.

To explain this phenomenon, it is possible to put forward the hypothesis that tantalum oxide and niobium oxide are particularly appropriate for adequate nucleation of a metal coating such as silver and lead to a better wetting, i.e. the growth of a more continuous coating which has fewer surface-spaced peaks. This leads to an exceptional homogeneity and a better continuity of the coating, so that its performance properties are improved.

Thus, according to the invention, it is possible to make all sorts of appropriate compromises, as a function of the thickness of the functional coating used and/or the requisite performance characteristics, because the invention makes it possible to obtain lower emissivity values for an identical functional coating thickness, or an unchanged emissivity level for a reduced thickness.

The major advantage of the invention is that this type of compromise can occur without it being detrimental to the optical performance characteristics, particularly with regards to the light transmission, of the product glazing which is crucial both in the building sector and in motor vehicles. In the prior art, lower emissivity values were only obtained by increasing the thickness of the functional coating and consequently, therefore decreasing the light transmission of the product.

Preferably, the layer below the functional coating has, apart from the aforementioned wetting layer, a thin metal oxide-based coating such as of tin oxide or titanium oxide, or of a nitride such as silicon nitride. The advantage of this embodiment is as follows. According to the invention it is possible to obtain the desired "wetting effect" with a relatively small thickness of the niobium or tantalum oxide coating. Moreover, it is necessary to ensure that the overall underlying layer has a certain thickness in order to maintain the optical interfering and protective effects of the layer with respect to the functional coating. Since the tantalum or niobium oxide deposition rate is not extremely high, particularly when deposition is carried out by cathodic sputtering, it is therefore of interest to deposit beneath the wetting layer a dielectric coating having a much higher deposition rate such as e.g. a tin oxide coating. Thus, it is possible to perform the invention without slowing down to a significant extent the production rates. This also leads to gains with regards to the cost of the niobium and tantalum starting materials. That is, these metals from which cathodic sputtering targets are made are more costly metals than tin.

Preferably, deposition also takes place on the functional coating of a metal or metal alloy-based coating such as of nickel-chromium, which is said to be "sacrificial", because its function is to protect the functional coating from oxidation during the subsequent deposition of the dielectric material above it and which normally takes place by reactive cathodic sputtering, i.e. in the presence of oxygen. In the end product, the sacrificial coating is consequently, as a function of its thickness and deposition conditions, partly or completely oxidized.

The dielectric material layer located above the functional coating advantageously is constituted of at least one tin oxide-based coating and/or tantalum oxide-based coating and/or silicon nitride coating. The interest in a combination constituted of a tin oxide coating surmounted by another coating, more particularly of tantalum oxide is that, as stated hereinbefore, the tin oxide deposition speed is relatively high. Moreover, tantalum oxide is a relatively hard and compact oxide, which effectively protects the entire multi-layer stack against corrosion. Thus, this splitting into two of the layer makes it possible to combine the advantages of a satisfactory production rate and of a very durable end product.

With regard to the thicknesses of the coatings and layers of the multi-layer stack of the invention, it is preferable to have a functional coating thickness between 7 and 12 nanometers, an overall thickness of the underlying layer between 30 and 60 nanometers and an overall thickness of the layer above the functional coating between 30 and 60 nanometers.

Advantageously, the coating based on tantalum or niobium oxide forming part of the "wetting" layer has a thickness between 5 and 30 nanometers, preferably 5 and 20 nanometers, particularly approximately 10 nanometers. This thickness range is adequate to obtain the effect sought after with regard to the properties of the functional coating. In the same way, the thickness of the sacrificial coating is preferably between 0.3 and 8 nanometers, particularly between 1 and 3 nanometers or even approximately 6 nanometers. Preferably a similar thickness range is chosen for the optional metal coating, which may surmount the tantalum or niobium oxide coating of the wetting layer, particularly a thickness range from 0.3 to 4 nanometers.

All these characteristics make it possible to manufacture glazings, particularly multiple insulating glazings, whose emissivity is equal to or below 0.08 and whose light transmission can remain high and can in particular be equal to or above 75% in the case of double glazings.

Obviously the advantages of the invention are even more pronounced when applied to substrates having several instead of one functional coating, e.g. two functional coatings placed between three layers of dielectric material. Advantageously each of the functional coatings is then provided with the wetting lawyer according to the invention.

Figure 1:
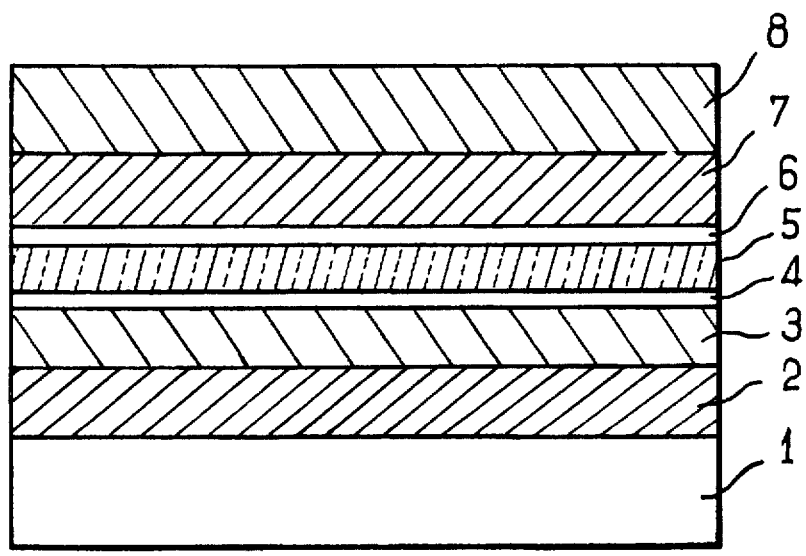
FIG. 1 shows an embodiment of the invention in which glass substrate 1 is coated by the tantalum or niobium oxide coating 3 which, optionally, can be placed on a tin oxide coating 2 and below a thin nickel chromium or tin coating 4. A silver-based functional coating 5 on layer 4 is then coated with a nickel-chromium-based sacrificial coating 6, above which are placed a tin oxide coating 7 and/or tantalum oxide coating 3.

Having generally described this invention, a further understanding can be obtained by reference to certain specific examples which are provided herein for purposes of illustration only and are not intended to be limiting unless otherwise specified.

It is pointed out that in the examples below, the successive thin coating deposits take place by a magnetic field-assisted cathodic sputtering method, but could also be obtained by any other method using a vacuum and ensuring a good control of the thicknesses of the coatings obtained. The substrates on which are deposited the multi-layer stacks are 4 mm thick soda-lime-silica glass substrates.

The deposition installation comprises at least one sputtering chamber having cathodes equipped with targets made from appropriate materials and under which the substrate 1 successively passes. The deposition conditions for each of the coatings are as follows:

i) The silver-based coating 5 is deposited with the aid of a silver target under a pressure of $8 \cdot 10^{-3}$ mbar (0.8 Pa) in an argon atmosphere.

ii) The $SnO_2$-based coating or coatings 2,7 are deposited by reactive sputtering with the aid of a tin target under a pressure of $8 \cdot 10^{-3}$ mbar (0.8 Pa) and in an argon/oxygen atmosphere with 36 vol. % oxygen, iii) The $Ta_2O_5$ or $Nb_2O_5$-based coating or coatings 3,8 are deposited by reactive sputtering with the aid of a tantalum or niobium target under a pressure of $8 \cdot 10^{-3}$ mbar (0.8 Pa) and in an argon/oxygen atmosphere including approximately 10 vol. % oxygen.

iv) The NiCr or Sn-based coating or coatings 4,6 are deposited with the aid of a tin or nickel-chromium alloy target under the same pressure and in an argon atmosphere.

The power densities and travel speeds of the substrate are adjusted in known manner in order to obtain the desired coating thicknesses.

A first series of examples relates to the use of the "wetting" layer according to the invention which employs tantalum oxide.

EXAMPLES 1 to 6

These examples reveal improvement with regard to the low emissivity properties of the multi-layer stack product of the invention.

Example 1 is a comparative example, because it has no tantalum oxide wetting layer.

The following Table 1 summarizes the structure of each of the multi-layer stacks and defines the thickness in nanometers of each of the coatings present.

TABLE I

|  | Ex 1 | Ex 2 | Ex 3 | Ex 4 | Ex 5 | Ex 6 |
| --- | --- | --- | --- | --- | --- | --- |
| $SnO_2$ (2) | 40 | — | — | — | 30 | 30 |
| $Ta_2O_5$ (3) | — | 38 | 38 | 38 | 10 | 10 |
| Ni—Cr (4) | 1 | 1 | 1 | 1 | 1 | 1 |
| Ag (5) | 9 | 9 | 7.9 | 9 | 9 | 9 |
| Ni—Cr (6) | 3 | 3 | 3 | 3 | 3 | 3 |
| $SnO_2$ (7) | 40 | — | — | 40 | — | 30 |
| $Ta_2O_5$ (8) | — | 38 | 38 | — | 38 | 10 |

Each of the thus coated six substrates is then used in a double glazing with the aid of another similar glass substrate (4 mm thick soda-lime-silica glass) separated from the first by a gas and, in this case, an air layer, with a thickness of 12 mm.

The following Table 2 indicates, for each of the examples, the light transmission $T_L$ value as a percentage, the energy transmission $T_E$ value as a percentage (measured on the basis of illuminant $D_{65}$), the values of the solar factor FS (without unit and which corresponds to the ratio of the total energy passing through the glazing to the incident solar energy), the values of the surface thermal transmission called the K factor and expressed in $W/m^2$ K and the emissivity values $\epsilon$ without unit.

TABLE 2

| Example | $T_L$ | $T_E$ | FS | K | $\epsilon$ |
| --- | --- | --- | --- | --- | --- |
| 1 | 74.4 | 52.6 | 0.64 | 1.77 | 0.09 |
| 2 | 77.9 | 55.2 | 0.64 | 1.72 | 0.06 |
| 3 | 77.5 | 58.2 | 0.68 | 1.76 | 0.08 |
| 4 | 76.9 | 54.1 | 0.64 | 1.75 | 0.07 |
| 5 | 76.6 | 54.6 | 0.64 | 1.74 | 0.07 |
| 6 | 75.6 | 52.9 | 0.64 | 1.76 | 0.08 |

All these examples, with the exception of Example 3, use the same thickness of the silver coating 5, the same thickness of the overall underlying layer 2, 3, 4 of approximately 40 nm and the same thickness of the overall layer 6, 7, 8 on the silver coating 5 and which is also approximately 40 nanometers.

On comparing examples 1 and 4, (4 differing from 1 only in the use of a $Ta_2O_5$ coating in place of a $SnO_2$ coating below the silver coating), it can be seen that the presence of the $Ta_2O_5$ coating (example 5) leads to a drop in the emissivity from 0.09 to 0.07, which constitutes a considerable improvement. This emissivity drop is also accompanied by an improvement of $T_L$ from 74.4 to 76.9%, which is also far from negligible and very advantageous.

Examples 5 and 6 constitute a compromise, because the underlying layer has, apart from the $Ta_2O_5$ coating according to the invention, a first $SnO_2$ coating.

The surprising point is that even in a limited thickness, the $Ta_2O_5$ coating continues to have a very favorable influence on the properties of the silver coating, because its emissivity remains equal to or below 0.08. The $T_L$ of these two examples is still higher than that of the comparative example 1. The secondary, but not negligible interest of splitting into two the underlying layer is that in this way it is possible to reduce production costs, tantalum targets being more expensive than tin targets, while also contributing to a rise in the production rates (it having been industrially proved that the tantalum oxide deposition rate is lower than that of tin oxide).

Everything is dependent on the desired performance level. Thus, examples 2 and 3 reveal that it is possible to further improve the properties of the multi-layer stack by the multi-layer presence of a relatively thick $Ta_2O_5$ coating 8 on the silver coating 5. Example 2, provided both with a $Ta_2O_5$ coating beneath the silver of 38 nm and a $Ta_2O_5$ coating on the silver of 40 nm, makes it possible to obtain an exceptionally low emissivity of 0.06 for a $T_L$ close to 78%.

Another choice can consist of seeking to reduce the thickness of the silver coating 5 without any reduction in the properties of the multi-layer stack. Thus, example 3 shows that with a reduction in the thickness of the silver coating of approximately 12%, the presence of two $Ta_2O_5$ coatings makes it possible to maintain a low emissivity of 0.08 and a high $T_L$ close to 78%. Moreover, the $T_E$ value of example 3 is significantly higher than that of example 1, the emissivity values being very close, which is very advantageous with respect to the improvement in the overall heat level in the passenger compartment equipped with such a glazing.

It should also be noted that the presence of a $Ta_2O_5$ coating on the silver coating, associated or not with a tin coating, leads to a very significant improvement of the chemical and physical durability of the multi-layer stack.

EXAMPLES 7 to 12

In order to better analyze the respective influence of the $Ta_2O_5$ coating 3 and the Ni-Cr coating 4 beneath the silver coating 5, a second series of examples 7 to 12 was performed, the multi-layer stacks being on this occasion free from oxide coatings 7, 8 on the silver coating 5.

Example 7 is a comparative example with no $Ta_2O_5$ coating below the silver coating 5.

The formation and thicknesses in nanometers of the coatings of these examples are given in Table 3.

TABLE 3

|  | $SnO_2$ (2) | $Ta_2O_5$ (3) | NiCr (4) | Ag (5) | NiCr (6) |
| --- | --- | --- | --- | --- | --- |
| Ex. 7 | 40 | — | 1 | 9 | 3 |
| Ex. 8 | — | 38 | — | 9 | 3 |
| Ex. 9 | 35 | 5 | — | 9 | 3 |
| Ex. 10 | 32.5 | 7.5 | — | 9 | 3 |
| Ex. 11 | 40 | 10 | — | 9 | 3 |
| Ex. 12 | 25 | 15 | — | 9 | 3 |

In order to evaluate the performance characteristics of these multi-layer stacks, using the 4 point method, the surface resistance $R_u$, expressed in square ohms of the latter was measured. The results are given in Table 4.

TABLE 4

| Examples | $R_\square$ |
| --- | --- |
| 7 | 8.0 |
| 8 | 6.5 |
| 9 | 7.8 |
| 10 | 7.5 |
| 11 | 7.2 |
| 12 | 7.2 |

Knowing that with a good approximation the square resistance can be considered proportional to the emissivity, it was again found that the underlying $Ta_2O_5$ coating leads to a significant improvement even, as is the case in examples 9 and 10, when it only has a limited thickness.

These examples also show that the Ni-Cr coating 4 is only optional and that the $Ta_2O_5$ coating is in itself sufficient to bring about considerable improvements in the optical properties of the silver coating.

Moreover, an analysis by atomic force microscopy gave information with respect to the surface state of the silver coatings. This analysis was carried out on 2 micrometer surfaces. It was first performed on the silver coating (5) of a multi-layer stack 7' identical to example 7, apart from the fact that it has no NiCr coating (4) and then on the silver coating (5) of the stack according to example 8.

Table 5 gives the analysis results with the values in nanometers of the peak-to-valley heights, as well as the mean lateral dimension (m.l.d.) of the masses in nanometers present on the surface of the coating.

TABLE 5

| Examples | peak-to-valley height | m.l.d. |
|---|---|---|
| 7' | 11.3 | 30 |
| 8 | 10.0 | 70 |

These figures can be interpreted as follows. On depositing a silver coating on a $Ta_2O_5$ coating (example 8) rather than on a $SnO_2$ coating makes it possible to slightly reduce the roughness of the surface of the silver, due to slightly smaller peak-to-valley height values. However, in parallel, there was a very considerable increase in the width of the masses or aggregates demonstrating the wetting effect provided by the invention, to the extent where the "wider" masses give the coating a better surface continuity and therefore bringing about better performance characteristics, particularly with regard to the electrical conductivity.

The following example relates to the use of the "wetting" layer according to the invention incorporating on this occasion niobium oxide.

EXAMPLE 13

Table 6 summarizes the structure of the stack according to this example and gives the thickness of each of the coatings in nanometers.

TABLE 6

| | Example 13 |
|---|---|
| $SnO_2$ (2) | 35 |
| $Nb_2O_5$ (3) | 10 |
| Sn (4) | 1 |
| Ag (5) | 10 |
| Ni—Cr (6) | 6 |
| $SnO_2$ (7) | 45 |

In this multi-layer stack type, the Ni-Cr coating 6 surmounting the silver coating (5) is thicker than in the previous examples, which has the effect of slightly reducing the light transmission of the carrying substrate provided with the multi-layer stack to a value below 70% and in particular approximately 60 to 65%. Thus, certain uses may require glazings having a lower light transmission. Thus, the underlying niobium oxide coating (3) and the "covering" of the silver coating (5) has a very similar effect to that of the tantalum oxide coating and is at least effective, while having a slight advantage with regard to the cost of the starting materials compared with tantalum oxide.

In conclusion, the invention has developed two novel types of dielectric layer below a functional coating and which act favorably on the properties of the latter and which are very flexible with regard to their use.

Having now fully described the invention, it will be apparent to one of ordinary skill in the art that many changes and modifications can be made thereto without departing from the spirit or scope of the invention as set forth herein.

What is claimed as new and is desired to be secured by Letters Patent of the United States is:

1. A transparent coated substrate, comprising:
   a) a transparent substrate;
   b) a first thin layer of a metal oxide or metal nitride coating the substrate;
   c) a wetting layer having a thickness of from 5 to 20 nm comprising a niobium oxide layer coating the metal oxide or metal nitride coating; and
   d) a thin layer of a functional metal coating on the wetting layer, wherein said functional metal coating has low infrared emissivity.

2. The transparent coated substrate of claim 1, wherein the metal oxide or metal nitride is tin oxide, titanium oxide, silicon nitride, or combinations thereof.

3. The transparent coated substrate of claim 1, wherein said wetting layer further comprises a first metal or metal alloy coating on the niobium oxide layer.

4. The transparent coated substrate of claim 3, wherein the first metal or metal alloy coating is tin or nickel chromium alloy and has a thickness of from 0.3 to 4 nm.

5. The transparent coated substrate of claim 1, wherein the functional metal coating is a silver coating.

6. The transparent coated substrate of claim 1, wherein the functional metal coating is coated with a sacrificial coating of a second metal or metal alloy coating having a thickness of from 0.3 to 8 nm.

7. The transparent coated substrate of claim 6, wherein the sacrificial coating is a nickel-chromium alloy.

8. The transparent coated substrate of claim 6, wherein the sacrificial coating has a thickness of from 1 to 3 nm.

9. The transparent coated substrate of claim 1, wherein the functional metal coating has a thickness of from 7 to 12 nm.

10. The transparent coated substrate of claim 1, wherein the total thickness of the coatings between the substrate and the functional metal coating is from 30 to 60 nm.

11. The transparent coated substrate of claim 1, wherein the wetting layer has a thickness of from 5 to 30 nm.

12. The transparent coated substrate of claim 1, wherein the wetting layer has a thickness of about 10 nm.

13. The transparent coated substrate of claim 1, wherein the total thickness of the coatings above the functional metal coating is from 30 to 60 nm.

14. The transparent coated substrate of claim 1, comprising two functional metal coatings having low infrared emissivity.

15. The transparent coated substrate of claim 1, wherein the substrate is a glass substrate.

16. A transparent coated substrate, comprising:
a) a transparent substrate;
b) a first thin layer of a metal oxide or a metal nitride coating the substrate;
c) a wetting layer comprising a tantalum oxide layer coating the first thin layer; and
d) a thin layer of a functional metal coating on the wetting layer, wherein said functional metal coating has low infrared emissivity.

17. The transparent coated substrate of claim 16, wherein said wetting layer further comprises a tin or nickel chromium alloy coating on the tantalum oxide layer.

18. The transparent coated substrate of claim 16, wherein the first thin layer of a metal oxide or a metal nitride is a coating of tin oxide, titanium oxide, silicon nitride, or combinations thereof.

19. The transparent coated substrate of claim 16, comprising a coating of tin oxide and a coating of titanium oxide, silicon nitride, or combinations thereof, or a combination thereof, on the functional metal layer, or on a sacrificial coating that is coated on the functional metal layer.

20. The transparent coated substrate of claim 16, wherein the functional metal coating has a thickness of from 7 to 12 nm.

21. The transparent coated substrate of claim 16, wherein the functional metal coating is a silver coating.

* * * * *